United States Patent [19]
Higgins

[11] Patent Number: 5,244,328
[45] Date of Patent: Sep. 14, 1993

[54] ANTI-SPLITTING DEVICE

[76] Inventor: James A. Higgins, 180 Wehler Rd., St. Mary's, Pa. 15857

[21] Appl. No.: 849,538

[22] Filed: Mar. 11, 1992

Related U.S. Application Data

[63] Continuation-in-part of Ser. No. 772,161, Oct. 7, 1991, abandoned.

[51] Int. Cl.⁵ .................................................. F16B 15/00
[52] U.S. Cl. ..................................... 411/477; 411/439; 81/23
[58] Field of Search ............... 411/407, 477, 478, 439, 411/457, 458, 912, 921; 81/20, 23, 125, 176.1, 176.15

[56] References Cited

U.S. PATENT DOCUMENTS

| | | | |
|---|---|---|---|
| 411,633 | 9/1889 | Balfour | 81/23 |
| 569,161 | 10/1896 | Balsley | 81/23 |
| 1,087,092 | 2/1914 | Stingle | 81/23 X |
| 1,208,255 | 12/1916 | Williams | 411/912 X |
| 1,300,275 | 4/1919 | Johnson | 411/407 X |
| 1,737,908 | 12/1919 | Beegle | 411/912 X |
| 1,793,185 | 2/1931 | McChesney | 411/439 |
| 1,925,238 | 9/1933 | Faries et al. | 411/478 |
| 1,934,134 | 11/1933 | McChesney | 411/478 |
| 2,080,962 | 5/1937 | Febrey | 411/478 |
| 2,223,506 | 12/1940 | Bowman, Jr. | 411/478 |
| 2,248,695 | 7/1941 | Bradshaw | 411/407 X |
| 2,287,964 | 6/1942 | Beegle | 411/478 |
| 3,082,658 | 3/1963 | Young | 411/478 |
| 3,134,291 | 5/1964 | Barry | 81/176.15 X |
| 3,721,153 | 3/1973 | Rosen | 411/477 |
| 4,273,172 | 6/1981 | Hoosier | 81/23 |
| 4,367,778 | 1/1983 | Bradbury | 81/23 |
| 4,486,999 | 12/1984 | Bayne | 411/477 X |
| 4,569,259 | 2/1986 | Rubin et al. | 81/176.15 X |
| 4,572,039 | 2/1986 | Desjardins | 411/407 X |
| 4,846,025 | 7/1989 | Keller et al. | 81/176.1 X |

FOREIGN PATENT DOCUMENTS

| | | | |
|---|---|---|---|
| 368020 | 1/1923 | Fed. Rep. of Germany | 411/477 |
| 550179 | 2/1923 | France | 411/477 |
| 552630 | 9/1958 | Italy | 81/23 |
| 053378 | 3/1923 | Sweden | 81/23 |
| 113594 | 7/1934 | United Kingdom | 411/477 |
| 413984 | 7/1934 | United Kingdom | 411/477 |

*Primary Examiner*—Peter M. Cuomo
*Assistant Examiner*—Suzanne L. Dino
*Attorney, Agent, or Firm*—Bean, Kauffman & Spencer

[57] ABSTRACT

A generally I-shaped, plastic anti-splitting device is provided with projections serving to removably attach the device to a driver, such as a manually operated hammer.

15 Claims, 1 Drawing Sheet

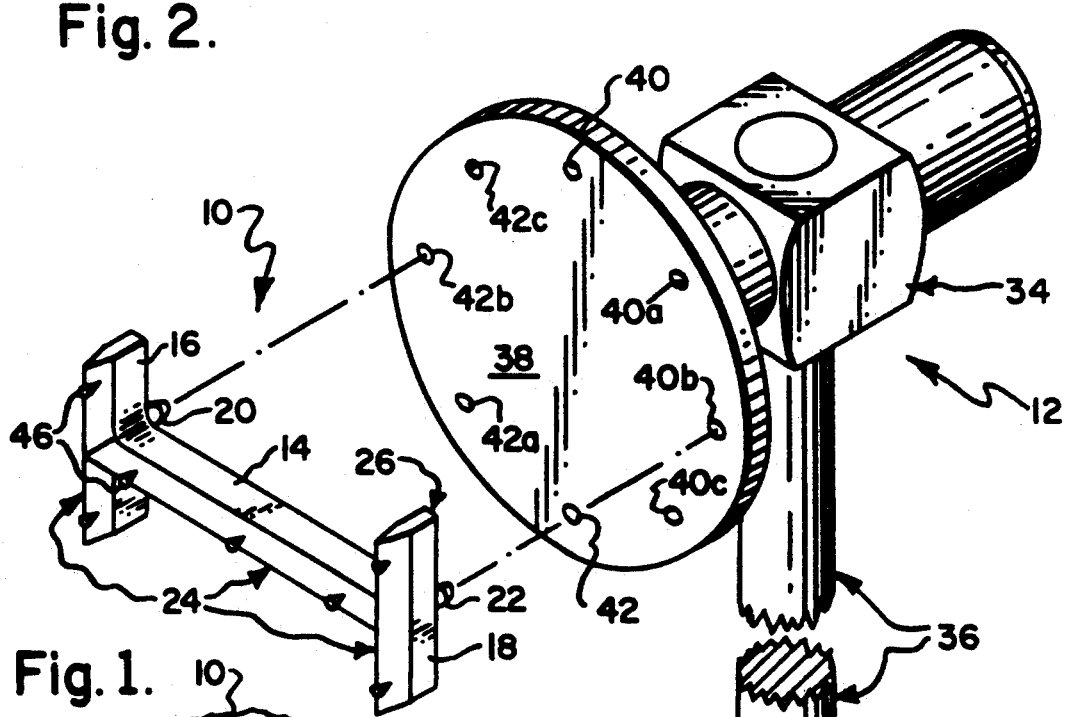
Fig. 2.
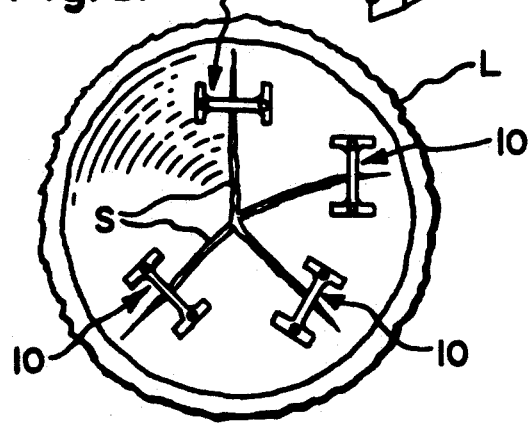
Fig. 1.
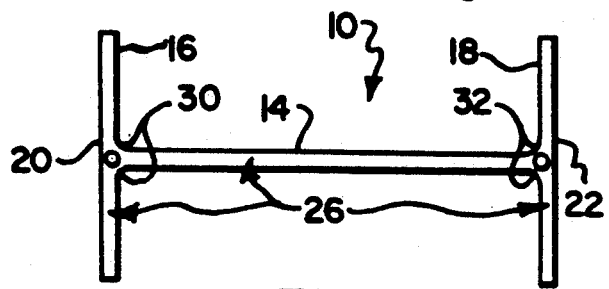
Fig. 3.
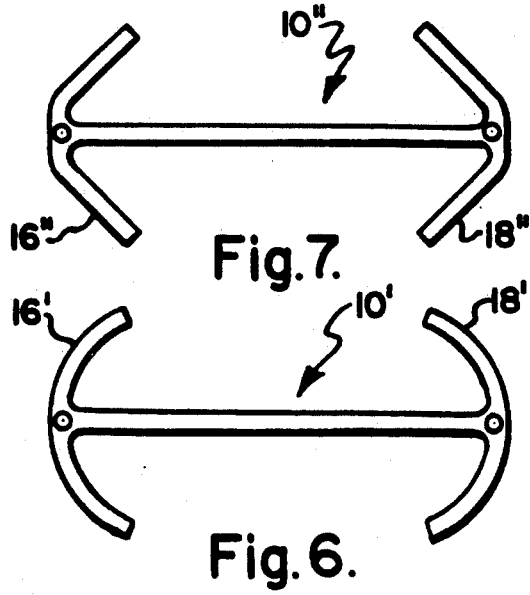
Fig. 7.
Fig. 6.
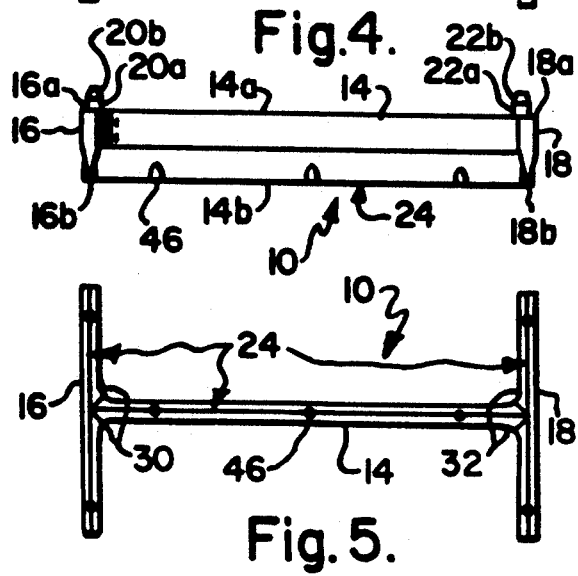
Fig. 4.
Fig. 5.

ANTI-SPLITTING DEVICE

RELATED APPLICATION

This application is a continuation-in-part of U.S. patent application Ser No. 07/772,161, filed Oct. 7, 1991, now abandoned.

BACKGROUND OF THE INVENTION

End splits in logs are a serious problem because they downgrade the logs and seriously decrease their value. A current method used to lessen the damage is to drive various types of anti-splitting devices into the end of a log in accordance with the teachings for instance of U.S. Pat. Nos. 1,208,255; 1,737,908; 1,925,238; 2,080,962; 2,223,596; 2,287,964; 3,082,658 and 4,486,999; and German Patent 368,020.

Prior anti-splitting devices pose several problems, namely, they are difficult to install, and being conventionally formed of steel, they cause "rust spotting" of the wood of a log adjacent to their points of insertions and they must be removed prior to further processing of the log in order to avoid damage to saws, veneer knives, etc.

SUMMARY OF THE INVENTION

The present invention is directed to a device for minimizing or preventing log end splits, while at the same time eliminating the problems created by prior metal anti-splitting devices.

The anti-splitting device of the present invention is preferably molded from a recycled plastic material to define a central web portion; a pair of end web portions, which are joined adjacent their midpoints to opposite ends of the central web portion to provide the device with generally I-shaped cross-sectional configurations, wherein the web portions have first side edges tapered to define a cutting edge and second side edges serving to define a planar driven surface disposed parallel to the cutting edge; and a pair of projections arranged to upstand from the driven surface and adapted to removably attach the device to a driver employed to insert the device into a log.

The driver of the present invention is preferably in the form of a manually operational hammer having a planar driver surface of circular plan form configuration and a plurality of pairs of recesses, which open through the driver surface and serve to slidably, frictionally receive the projections of the device and to selectively orient the device relative to the driver surface and thus the end of a log into which the device is to be driven upon swinging of the driver.

BRIEF DESCRIPTION OF THE DRAWINGS

The nature and mode of operation of the present invention will now be more fully described in the following detailed description taken with the accompanying drawings wherein:

FIG. 1 is an end view of a log showing antisplitting devices of the present invention inserted thereinto;

FIG. 2 is an exploded, perspective view illustrating a mode of releasably mounting the anti-splitting device on a driver;

FIG. 3 is a top plan view of the device shown in FIGS. 1 and 2;

FIG. 4 is a side elevational view thereof;

FIG. 5 is a bottom plan view thereof;

FIG. 6 is a top plan view of an alternative form of the device; and

FIG. 7 is a top plan view of a further alternative form of the device.

DETAILED DESCRIPTION

Reference is first made to FIGS. 1 and 2, wherein an anti-splitting device of the present invention is generally designated as 10, and shown as being inserted into an end of a log L for purposes of minimizing or preventing enlargement of splits S, and in association with a driver 12 adapted for use in manually driving the device into such log.

Device 10 is best shown in FIGS. 2-5 as generally including a central web portion 14; a pair of end web portions 16 and 18, which are joined adjacent their respective mid-points to opposite ends of the central web portion; and at least two and preferably a pair of projections 20 and 22, which serve to orient and removably attach the device to driver 12 in the manner to be described.

Web portions 14, 16 and 18 are considered to have first and second or opposite side edges 14a and 14b, 16a and 16b, and 18a and 18b, respectively, wherein first side edges 14a, 16a and 18a are tapered, best shown in FIGS. 4 and 5, to define a cutting edge 24, and second side edges 14b, 16b and 18b are essentially coplanar and cooperate to define a driven surface 26, best shown in FIGS. 3 and 4, disposed essentially parallel to cutting edge 24.

In a presently preferred and commercially available form of device 10, web portions 14, 16 and 18 are planar and joined in a right angular relationship, and together with projections 20 and 22 are integrally mold formed from plastic material, as opposed to being formed of metal, with a view towards avoiding discoloration or "rust spotting" of those portions of the wood of a log adjacent the area into which the device is driven by driver 12, and to permit subsequent cutting operations to be performed on the log without need for prior removal of the device therefrom. When so formed, it is preferable to provide integrally formed radiused filler portions 30 and 32 joined to web portions 14, 16 and 18 adjacent their junctures and to arrange projections 20 and 22 to upstand from driven surface 26 adjacent such junctures, as best shown in FIG. 3. Filler portions 30 and 32 have proven effective in minimizing structural failure of device 10 adjacent the junctures of web portion 14 with web portions 16 and 18 incident to the driving of device 10 into a log, and the remote placement of projections 20 and 22 relative to one another adjacent the ends of web portion 14 and preferably in overlying relation to the junctures of the web portions has proven effective in preventing premature separation of device 10 from driver 12, during a driving or insertion operation.

Projections 20 and 22 may be variously configured, but they are preferably shaped to define generally cylindrical base portions 20a and 22a and rounded or generally conical free end or guide portions 20b and 22b.

Driver 12 is shown in FIG. 1 as being in the form of a hammer having a weighted head 34 and a manually manipulated handle 36, wherein head 34 is provided with a planar driver surface 38 through which open at least one pair of recesses 40 and 42 sized and spaced to removably, slidably receive projections 20 and 22 for purposes of orientating driven surface 26 relative to driver surface 38 and removably attaching device 10 to driver 12 immediately prior to and during a device driving or insertion operation. Preferably, projections 20 and 22 and recesses 40 and 42 are sized to permit device 10 to be frictionally coupled to driver 12 incident to user insertion of the projections into the recesses, while permitting sliding separating movement thereof incident to "bounce back" of driver 12 relative to log L at the completion of a device insertion operation.

When driver 12 is in the form of a manually operated hammer of the type illustrated in the drawings, it is preferable to provide driver surface 38 with a generally circular configuration, wherein recesses 40 and 42 are spaced essentially equidistant from the center of surface 38, and to provide multiple pairs of recesses 40 and 42, 40a and 42a, 40b and 42b, and 40c and 42c arranged in a uniformly spaced relationship annularly of the driver surface in the manner shown in FIG. 2. As shown in FIG. 2, the ends of recesses 40 and 42, 40a and 42a, 40b and 42b, and 40c and 42c are spaced inwardly of the periphery of driver surface 38. When projections 20 and 22 are of circular cross-section, as shown in FIGS. 1 and 3, the recesses opening through driver surface 38 would have a like cross-section, as shown in FIG. 2.

As with prior log anti-splittinq devices, devices 10 would normally be applied to logs resting on the ground in the field or in a log collection area prior to transport of the logs to a point at which they are intended to be cut into lumber or veneer. For the case of prior devices, it was necessary for a Worker to manually position a device across a split and then hold the device with one hand, while using his other hand to impart several swings to a hammer for purposes of driving the hand positioned device into the log. Since, as indicated in FIG. 1, splits are randomly arranged, it was normally necessary for the worker to change his position relative to the log after each insertion operation.

In accordance with the present invention, device 10 may be inserted into log L without the requirement for a worker to manually hold device 10, during insertion thereof, and/or change positions relative to the log between successive insertion operations. Specifically, it is contemplated that each insert 10, after being temporarily attached to driver surface 38 by means of projections 20 and 22, may be driven into log L by a single backhand or underhand swing of driver 12. Care should be exercised by a worker to ensure that the driver surface is arranged essentially at right angles to the direction of the grain of the log, during the terminal portion of the swing of the driver, to thereby ensure that the device is driven fully into the log in a direction parallel to its grain. Rebound or bounce back of the driver serves to disengage the inserted device therefrom. Like swings are employed to drive additional devices 10 into log L with their orientation relative thereto and to each other being deter mined by the pre-positioning of projections 20 and 22 of such devices within selected pairs of recesses 40 and 42, 40a and 42a, 40b and 42b, and 40c and 42c.

As by way of example of a present commercial form of the invention, device 10 shown in FIGS. 1-5, has a central and end web portions having lengths of about 3¾ and 2 inches, respectively, thicknesses of about 3/64 inch, and widths, as measured between their side edges, of about ½ inch. When anti-splitting devices of the present invention are intended for use with a flitch or cant, as opposed to a log, the lengths of the web portions of such devices would be reduced by about one half with their web portion thicknesses and widths remaining essentially the same. Enlargements 46 located in the area cutting edge 24 occur as a result of the device mold forming operation, and do not appear to adversely affect driving of the device into a log.

While the anti-splitting device of the present invention may be cast from metal, it is preferably integrally mold formed from recycled polycarbonate plastic material.

FIGS. 6 and 7 illustrate alternative anti-splitting device designs designated as 10' and 10", wherein their end web portions 16' and 18', and 16" and 18" are arcuate and generally V-shaped, respectively, and the facing surfaces of such end web portions are generally concave. There has been insufficient experience with these alternative designs to determine their degree of utility relative to the design of presently preferred device 10, and/or whether they would be equally adapted for use, if the facing surfaces of their end web portions were made convex, as opposed to concave. However, these alternative designs are contemplated for use and they and the preferred design are collectively characterized as having a generally I-shaped configuration when viewed in plan.

The anti-splitting device of the present invention has been disclosed for use with a manually operated hammer having a plurality of differently orientated pairs of recesses. However, it is contemplated that the device would have utility with a portable electrically or pneumatically powered driver, where a suitable source of power is available, and for this latter case the driver would only require one pair of device positioning recesses, if the driver could be conveniently positioned to vary the orientation of the devices, as presented to an end of a log.

What is claimed is:

1. A device for minimizing end splits in a log and adapted to be driven into said log by a driver characterized as having an essentially planar driver surface and at least one pair of parallel recesses opening through said driver surface and adapted for use in orientating and removably attaching said device relative to said driver surface, said device comprising:

a central web portion;

a pair of end web portions joined adjacent midpoints thereof to opposite ends of said central web portion to provide said device with a generally I-shaped plan view configuration, said web portions having oppositely facing first and second side edges, said first side edges being tapered to define a cutting edge to facilitate insertion of said device into said log, said second side edges being essentially coplanar and parallel to said cutting edge to define a driven surface to which force may be applied to said device by said driver surface for inserting said cutting edge into said log; and at least two projections upstanding from said driven surface, said projections are sized and arranged for removable, slidable receipt within said recesses, and said web portions and said projections being integrally formed from molded plastic material.

2. A device according to claim 1, wherein said projections upstand from said driven surface adjacent said opposite ends of said central web portion.

3. A device according to claim 2, wherein said projections are parallel posts having cylindrical base portions and rounded free ends portions.

4. A device according to claim 1, wherein radiused filler portions are joined to said web portions at the junctures thereof.

5. A device according to claim 4, wherein said projections are post upstanding from said driven surface at said junctures of said web portions.

6. A device according to claim 1, wherein said web portions are planar and joined in a right angular relationship, radiused filler portions are joined to said web portions at the junctures thereof, and said projections are parallel posts upstanding from adjacent said junctures.

7. The combination comprising:
a device adapted to be driven into a log for minimizing end splits therein, said device having a central web portion, a pair of end web portions joined adjacent midpoints thereof to opposite ends of said central web portion to provide said device with a generally I-shaped plan view configuration, said web portions having oppositely facing first and second side edges, said first side edges being tapered to define a cutting edge to facilitate insertion of said device into said log, said second side edges being essentially coplanar and parallel to said cutting edge to define a driven surface to which force may be applied to said device for inserting said cutting edge into said log, and at least two projections upstand from said driven surface; and
a driver for driving said cutting edge of said device into said log, said driver having a driver surface sized to engage with said driven surface throughout the extent thereof, and a pair of recesses having ends opening through said driver surface, and said recesses are sized and arranged to removably, slidably receive said projections inserted through said ends thereof for orientating and removably mounting said device relative to said driver surface.

8. The combination according to claim 7, wherein said driver surface is of generally circular plan view configuration, said recesses of said pair are arranged essentially equidistant from a center of said driver surface, and said ends of said recesses open through said driver surface inwardly of a periphery thereof.

9. The combination according to claim 8, wherein a plurality of pairs of said recesses are provided, and said pairs of said recesses are spaced apart in relatively uniform manner annually of said driver surface.

10. The combination according to claim 7, wherein radiused filler portions are joined to said web portions at the junctures thereof, and said projections are post upstanding from said driven surface at said junctures of said web portions.

11. The combination according to claim 10, wherein said driver surface is of generally circular plan view configuration, a plurality of pairs of said recesses are provided and arranged in a non-aligned relationship, said recesses of said pairs are arranged essentially equidistant from the center of said driver surface and have their ends opening through said driver surface inwardly of a periphery thereof.

12. A device adapted to be driven into a log for minimizing end splits therein, said device comprising:
a central web portion;
a pair of end web portions joined adjacent midpoints thereof to opposite ends of said central web portion to provide said device with a generally I-shaped plan view configuration, said web portions having oppositely facing first and second side edges, said first side edges being tapered to define a cutting edge to facilitate insertion of said device into said log, said second side edges being substantially coplanar and parallel to said cutting edge to define a driven surface to which force may be applied to said device for inserting said cutting edge into said log; and
a pair of parallel projections upstanding from said driven surface, and said web portions and said projection are integrally mold formed.

13. A device according to claim 12, wherein said projections upstand from said driven surface adjacent said opposite ends of said central web portion.

14. A device according to claim 13, wherein said projections are posts having cylindrical base portions and rounded free end portions.

15. A device according to claim 12, wherein said web portions are planar, radiused filler portions are joined to said web portions at the junctures thereof, and said projections are posts upstanding from said driven surface from adjacent said junctures.

* * * * *